United States Patent Office 3,666,521
Patented May 30, 1972

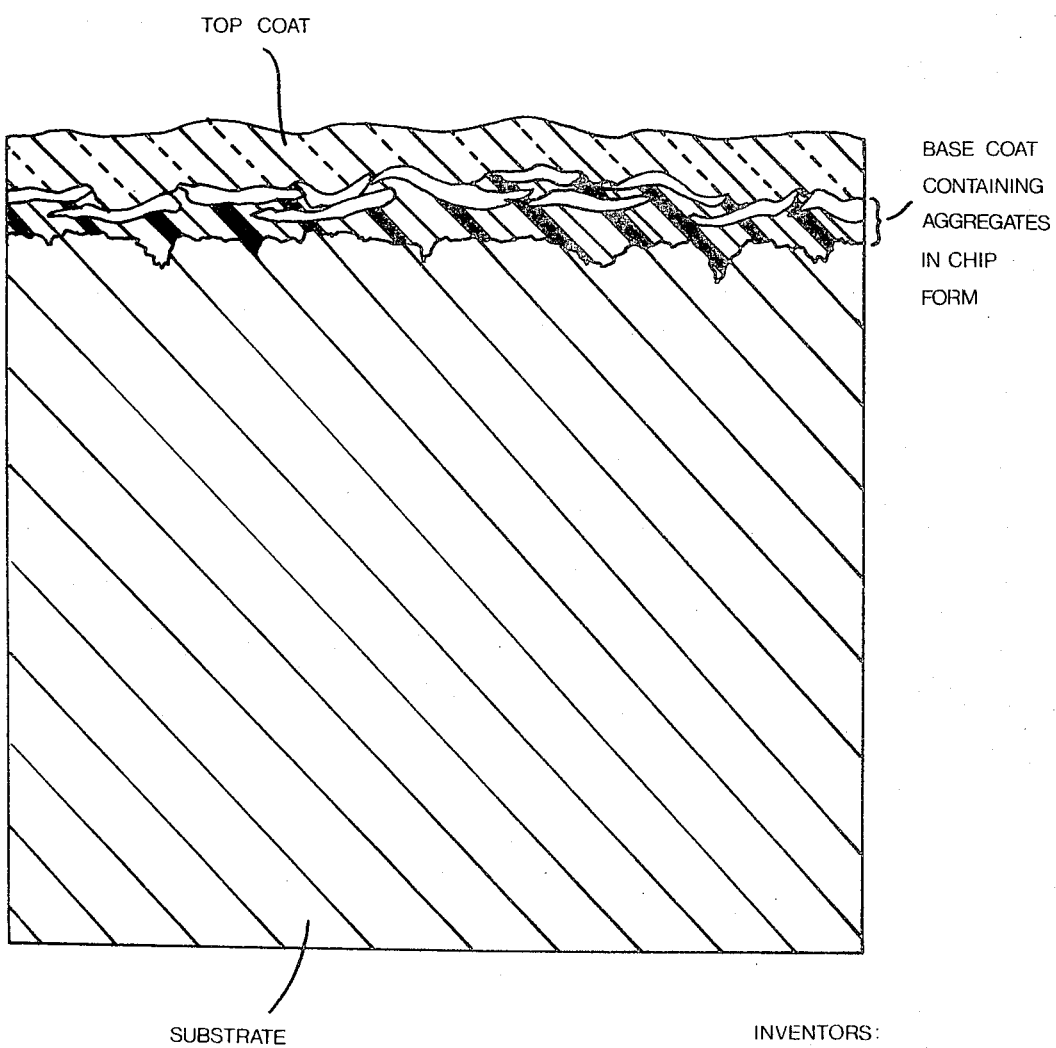

---

3,666,521
COATED SUBSTRATE AND METHOD OF PROVIDING SAME
Philip L. Weyna, Crystal Lake, and Volney P. Thuma and David A. Frey, Woodstock, Ill., assignors to Morton-Norwich Products, Inc., Chicago, Ill.
Filed June 18, 1970, Ser. No. 47,544
Int. Cl. B44d 1/14
U.S. Cl. 117—26                         8 Claims

ABSTRACT OF THE DISCLOSURE

A method of applying a durable coating to a substrate such as floors, walls, furniture, metal and the like involving applying to the substrate a base coating of an aqueous copolymer dispersion, adding solid particulate aggregate to the base coat, drying the mixture and then adding a top coat of an aqueous dispersion of a cross-linkable copolymeric composition comprising an aqueous copolymer dispersion prepared from, on an overall basis, about 30 to about 60 weight percent of a combination of at least one monoethylenically unsaturated hardening monomer and at least one monoethylenically unsaturated softening monomer, and from about 1 to about 10 weight percent of a cross-linking agent, said hardening monomer comprising from about 25 to about 60 weight percent of the total monomers and being selected from the group consisting of styrene, acrylonitrile, and alkyl methacrylates, and said softening monomer comprising up to about 75 weight percent of the total monomer composition and being selected from the group consisting of alkyl acrylates containing from 1 to 10 carbon atoms in the alkyl group, and drying to form an attractive, tough and resilient coating.

---

BACKGROUND OF THE INVENTION

Field of the invention

The field of this invention is broadly that of providing tough durable coatings to a variety of substrates such as wood, synthetic resinous compositions, glass, metal, cement and/or concrete. More narrowly, the field of this invention relates to applying said coatings to floors and flooring materials for the purpose of renovating same or for providing original attractive and resilient coverings thereon.

Description of the prior art

Conventional methods for the maintenance of floors, whether they be wood, wood covered with synthetic resinous materials, or cement and/or concrete, generally involve the application thereto of various polish or coating compositions to preserve and/or render the floor more attractive. When floors become old and traffic worn, the usual maintenance procedure involves hiding the defects by covering with either carpeting or one of the numerous synthetic floor coverings commercially available.

Throughout the years chemists have developed a variety of polishes for application to floors to provide gloss, resistance to dirt, detergents and black-heel marks. Nevertheless, the polishes themselves fail to obsecure the scars and other mainifestations of physical abuse sustained by floors after periods of extensive traffic.

It is known in the art to apply various solvent-based coatings to substrates or floors for the purpose of renovating same. These coatings generally contain polyurethanes, polyethers, epoxies, and polyacrylates in a solvent medium such as toluene, xylene, mineral spirits, turpentine, ketones, esters and alcohols. As is readily appreciated, the use of solvents in a confined area represents a health hazard due to the toxicity of the volatile fumes emanating therefrom and also a fire hazard due to their low flash points. Consequently, the use of solvents requires that onerous safety precautions be taken in addition to the usual disagreeable cleanup requirements attendant upon the use of solvents.

The expedient of covering a worn floor with carpeting provides a quick and easy solution to the problem yet such solution has the disadvantage of being fairly expensive in addition to the usual maintenance burden. Where the floor has had a tile covering which has become worn, defaced or damaged, removal of the old tile and replacement thereof by a new one is the customary procedure. As can be appreciated, this is a rather drastic step requiring a sizeable monetary investment and the exercise of considerable skill in laying and fitting the new tile.

Accordingly, it would be desirable to provide a coating system for safety, efficiently and economically covering various substrates with an adherent, durable coating and for coating floors to obscure surface defects and provide a new finish thereon without the necessity of removing existing coatings or coverings therefrom, and a method for applying said coating.

It is therefore an object of the present invention to provide a coating system for floors to renovate same by forming resilient, durable opaque coatings thereon without the necessity of removing existing coverings therefrom.

It is another object of the present invention to provide a method of coating rigid substrates to form durable and attractive coatings thereon without the necessity of removing existing coatings therefrom.

It is still another object of this invention to provide a method of covering floors or of renovating same by forming a resilient coating thereon from an aqueous coating system without the necessity of using organic solvents and without the necessity of removing existing coatings from the floor surface.

It is a further object of the present invention to provide a method of renovating worn floors by forming resilient durable coatings thereon without the necessity of removing existing coatings therefrom, said renovation to permit the floor to return to traffic after 24 hours from the beginning of coating and exhibit excellent resistance to detergents, chemicals, black-heel marks and sunlight.

SUMMARY OF THE INVENTION

Accordingly, in one broad form the foregoing objects are attained by the process of the present invention for applying a durable covering to a substrate which process comprises applying to said substrate a base coating comprising an aqueous copolymer dispersion, adding to said base coating a plurality of discrete particulate aggregates, drying said aggregate-containing base coating to fix the aggregate therein, applying to said dried aggregate-containing coating a clear top coating comprising an aqueous copolymer dispersion containing a cross-linking agent, and drying said top coating.

Base coating

The base coating contains as essential components water, a water insoluble polymer obtained by the emulsion polymerization of at least one monoethylenically unsaturated monomer or monomers, and one or more surfactants. The non-volatile content of the base coating ranges from about 30 to about 60 weight percent. The monoethylenically unsaturated monomer or monomers may include the following and combinations thereof: Styrene and methylated styrenes, butadiene, isoprene, vinyl chloride, vinylidene chloride, vinyl acetate, acrylonitrile, alkyl acrylate esters containing up to 10 carbon atoms in the alkyl group such as methyl acrylate, ethyl acrylate, hydroxyethyl acrylate, propyl acrylate, butyl acrylates, pentyl acrylates, hexyl acrylates, heptyl acrylates, octyl acrylates including 2-ethylhexyl acrylate, nonyl acrylates and decyl acrylates. Other branched acrylates which can also be used include: 3-ethylhexyl acrylate, 3,4-dimethylhexyl acrylate, 2-ethylheptyl acrylate, 3-ethylheptyl acrylate, 4-ethylheptyl acrylate, 3-methylheptyl acrylate, 4-methylheptyl acrylate, 5-methylheptyl acrylate, 6-methylheptyl acrylate, 2,3-dimethylheptyl acrylate, 3-ethyloctyl acrylate, 5-ethyloctyl acrylate, 2,3-dimethyloctyl acrylate, 3-methyloctyl acrylate, 6-methyloctyl acrylate, isopropyl acrylate and isobutyl acrylate; alkyl methacrylate esters containing up to 10 carbon atoms in the alkyl group such as methyl methacrylate, ethyl methacrylate, hydroxyethyl methacrylate, propyl methacrylate, butyl methacrylates, hexyl, heptyl, octyl, nonyl and decyl methacrylates; unsaturated monobasic carboxylic acids such as acrylic acid, methacrylic acid, and crotonic acid; and unsaturated dibasic acids such as fumaric acid, maleic acid, and itaconic acid, and esters thereof.

Other acids which are useful are the half esters of the unsaturated dicarboxylic acids formed by the reaction of an aliphatic alcohol containing up to 4 carbon atoms with an unsaturated dicarboxylic acid selected from the group consisting of itaconic acid, fumaric acid and maleic acid.

The surfactant may be selected from among the anionic and nonionic surface active agents, or mixtures thereof. Exemplary of these are the anionic and nonionic surface active agents which include sodium dodecylbenzene sulfonate, alkali salts of complex organic phosphate esters, alkyl aryl sulfonate, sodium lauryl ether sulfates, sodium lauryl sulfate, and other alkali metal salts of sulfated fatty alcohols, the octyl and nonylphenoxy (polyethyleneoxy) ethanols, polyoxyalkylene ethanols, polyoxyethylene sorbitan fatty acids and fatty acid alkanolamides, and the like.

If desired, up to about 55 weight percent of any of the known pigments may be employed to lend opacity to the base coating. These include, but are not limited to mineral matter such as titanium dioxide, inorganic sulfates, silicates, oxides, hydroxides, sulfides, carbonates, a variety of various fillers such as talc, clays, and earths, and organic dyes and colorants.

In addition, up to about 10 weight percent of a plasticizer, or combinations of plasticizers may be used. The plasticizer (or plasticizers) employed in the base coat is preferably of the so-called permanent type such as the phthalates including dimethyl phthalate, diethyl phthalate, dibutyl phthalate, dioctyl phthalate, diallyl phthalate, 2-ethyl hexyl phthalate, 2-ethyl hexyl benzyl phthalate, and dibenzyl phthalate; the glycols, glycol ethers and glycol esters including ethylene glycol, diethylene glycol, butyl phthalyl butyl glycolate, and diethylene glycol dibenzoate; the phosphates such as tricresyl phosphate, tributyl phosphate, triphenyl phosphate and tributoxyethyl phosphate, and other available plasticizers such as toluene ethyl sulfonamide and acetyl tributyl citrate, and combinations of any of the foregoing.

The polymerization procedure employed to prepare the base coat is that conventionally used in the art and comprises adding the monomer or monomer blend with continuous stirring to an aqueous polymerization medium containing a surface active agent and a free radical catalyst. The reaction is conveniently carried out at a temperature of from about 80° C. to about 90° C.

The monomer concentration used to prepare a pigmented and plasticized base coat, on an overall basis, may range from about 5 to about 25 weight percent. Anionic surfactants, exemplified by alkyl aryl sulfonates and/or alkyl sulfates, may be used alone or in blends with nonionic surfactants, in amounts ranging from about 0.2 to 2 percent. The pigment content may vary from as little as 5 to about 55%. The plasticizer content may range from about 2 to about 20 percent. The time of polymerization is not critical and it should be understood that by utilizing certain catalyst systems, such as for example, redox systems, the polymerization may be carried out in a relatively short time. Accordingly the time of polymerization may extend from about 15 to about 240 minutes, although for most purposes from about 30 to 180 minutes are adequate.

In one preferred form, the composition of the pigmented and plasticized base coat comprises, on an overall basis, from about 5 to about 25 weight percent of at least one water insoluble polymer obtained by the emulsion polymerization of a monoethylenically unsaturated monomer selected from the group consisting of styrene, butadiene, isoprene, vinyl chloride, vinylidene chloride, vinyl acetate, acrylonitrile, methacrylic acid, and alkyl acrylate and methacrylate esters containing from 1 to 10 carbon atoms in the alkyl group, from about 0.2 to about 2 percent of one or more of the aforementioned surface active agents, up to about 30 weight percent of a pigment such as titanium dioxide, and up to about 10 weight percent of one or more plasticizers selected from the group consisting of tributyl phosphate, dibutyl phthalate, and ethylene glycol. It is understood, of course, that the composition may also contain pigment dispersing aids, thickeners, protective colloids, and leveling agents as desired.

Aggregates

After the base coat has been applied, discrete particulate aggregates in the form of chips or flakes are sprinkled thereon, and the mass is allowed to dry to fix the aggregates therein. The exact nature of the aggregates is not deemed important and may include pigmented synthetic resins such as polyvinyl chloride, polystyrene, polyvinyl acetate, synthetic rubber, polyphenolformaldehyde, polyacrylic and methacrylic esters and the like, or glass, sand, paper, metal and a variety of minerals or mixtures thereof. In one preferred form, aggregates in chip form are produced by adding fillers and pigments such as clays, barium sulfate, calcium carbonate, and titanium dioxide to an aqueous copolymer dispersion, depositing the resultant mass on a metal substrate, drying and flaking off the dried product.

Top coating

The clear top coating of this invention must fulfill a number of requirements to meet the qualities expected of a substrate coating, especially a floor top coating. This cotating must have a relatively high solids content and low viscosity. It must have a minimum film forming temperature low enough to form a well-knit, continuous film at temperatures as low as 15° C. It must not be so soft that the traffic-bearing surface will be tacky and cause rapid soiling. It must produce a tough surface to resist wear or foot traffic. It should produce a film which is light-stable, stain resitsant, non-yellowing and glossy. It should be non-toxic, odor-free, and non-flammable. It should produce a film which is easily cleanable, resistant to black heel marks and readily recoatable after several months of traffic and accompanying wear. And finally, it must produce a film which is resistant to attack by common household cleaning agents, foods and industrial solvent-based cleaning compositons. These requirements are met by the application to the dried aggregate-containing coating of a clear top coating composition comprising an aqueous cross linkable copolymer dispersion, i.e., an aqueous copolymer dispersion containing a cross-linking agent, the copolymer concentration ranging from about 30 to about 60 weight percent. More particularly, the top coating contains as essential components water, a water insoluble polymer obtained by the emulsion polymerization of a combination of monoethylenically unsaturated monomers, and cross-linking or cross-linkable monomers or agents.

The combination of monoethylenically unsaturated monomers includes those hereinbefore described in connection with the base coating. The combination of monomers selected must provide a non-yellowing film of exceptional toughness and resilience, be resistant to soil pick-up, and display excellent wear-ability. Accordingly, the combination of monomers utilized represents a selection among hardening monomers, softening monomers, and cross-linking or cross-linkage monomers or agents. The term "hardening monomers" as used herein includes those monomers which yield homopolymers having glass transition temperatures about 10° C. Similarly, the term "softening monomers" refers to those monomers which yield homopolymers having glass transition temperatures below 10° C.

The hardening monomers include many of the alkyl methacrylates. Methyl methacrylate is the lowest cost methacrylate. It is quite reactive, imparts very little color to the polymer and contributes to the durability of the traffic-bearing surface. On a monomer basis, it may be used up to a concentration of about 60 percent by weight. In one preferred aspect of this invention, its concentration ranges from about 25 to about 60 weight percent. As is readily understood, other methacrylate monomers may be used interchangeably with methyl methacrylate depending on the specific properties desired in the finished coating. In addition, acrylonitrile may be used for the purpose of imparting a degree of toughness and "dryness" to the dried film or coating. The term "dryness" refers to a lack of stickiness or tack of the coating. Acrylonitrile may be employed up to about 35 weight percent of the monomer composition. A preferred range is from about 5 to about 25 weight percent.

Styrene is a monomer which contributes hardness and may be employed up to about 60 weight percent of the total monomer content. Other known hardening monomers from among the monoethylenically unsaturated monomers may be employed as desired.

The alkyl acrylate esters containing from 1 to 10 carbon atoms in the alkyl group are the most preferred softening monomers. As the alkyl group of the acrylate ester is extended beyond methyl, the monomer contributes increasing softness to the polymer. Methyl, ethyl and butyl acrylates may be used interchangeably, but butyl is most preferred. Longer chain acrylates may be used but cost becomes a factor beyond 2-ethylhexyl acrylate. The softening monomers may be used in conjunction with hardening monomers at a concentration up to about 75 percent by weight. A preferred concentration range is from about 30 to about 60 percent by weight of the monomer content.

Inasmuch as the top coating of the substrate or floor is exposed to wear, traffic, sunlight, and a host of commercial cleaning agents, this coating must be resistant thereto. Resistance is provided by cross-linking the coating to render it impervious to the action of household chemicals and resistant to ordinary wear and tear. Cross-linking is accomplished in some instances by the use of a particular cross-linking agent to bring about the formation of methylene bridges across the backbones of neighboring polymer molecules with the concomitant liberation of formaldehyde and water.

Useful cross-linking agents in the practice of the present invention are those selected from the group consisting of carboxylic acids, methylol carboxylic amides, carboxylic amides, hydroxyethyl carboxylate, allyl carboxylates and glycidyl carboxylates such as glycidyl acrylate and glycidyl methacrylates. Preferred cross-linking agents are N-methylol acrylamide, acrylamide, N-methylol methacrylamide, and methacrylamide at a concentration, based on total monomer content, of from about 1 to about 10 percent by weight. A preferred range of concentration is from about 2 to about 8 percent by weight. Of course, it is understood that combinations of cross linking agents may be employed to achieve special effects as desired.

If desired, acid containing monomers in addition to small quantities of plasticizers, anti-foaming agents and cross-linking catalysts may be employed in the top coating to provide special benefits. For example, catalysts such as aluminum chloride, ammonium chloride or zinc nitrate may be used to speed up the cross linking reaction. Any one or more of the previously described plasticizers may be used to lend desired plasticity to the coating. Anti-foaming agents may be added in those instances where excessive foaming is encountered.

Optional ingredients of the top coating composition may include epoxy resins, amines such as hexamethoxy-methylmelamine, anhydrides, and peroxide catalysts. The epoxy resin component of the compositions of this invention may be of any of those usually used in molding compounds such as, but not limited to, glycidyl ethers of phenol-formaldehyde resins, glycidyl ethers of polyphenols, cycloaliphatic epoxy compounds, and the diglycidyl ethers of bisphenol A. These epoxy resins are commercially available under the trade names Epon 834, Epon 1001, Epon 1002, Epon 1031, Epon 1009, Epi-Rez 515 and Epi-Rez 5163; the Genepoxy resins, the Araldite resins, and the like. Epoxylated novolac resins are also useful and are available under the trade names CIBA ECN 1235, 1273, 1280, 1299 and Dow DEN 438.

BRIEF DESCRIPTION OF THE DRAWING

The drawing is an enlarged cross-section of a substrate coated according to the process of the present invention. Depicted therein is the substrate having thereon a base coating containing aggregate chips fixed therein with a top coating thereover.

In one preferred form, the process of the present invention comprises:

(I) applying to a floor as a base coating a pigmented aqueous copolymer dispersion prepared from, on an overall weight basis, from about 10 to about 25 percent of a combination of monomers comprising styrene, acrylonitrile and methacrylic acid, from about 2 to about 10 percent of one or more plasticizers selected from the group consisting essentially of tributyl phosphate, dibutyl phthalate, and ethylene glycol, from about 0.2 to about 2 percent of a nonionic surfactant, and from about 15 to about 30 percent of titanium dioxide.

(II) adding to said base coating a plurality of discrete particulate aggregates consisting of pigmented polyvinyl acetate chips and drying the aggregate-containing base coat to fix the aggregates therein, and (III) applying to said dried aggregate-containing base coating a top coating composition comprising an aqueous copolymer dispersion prepared from, on an overall weight basis, from about 30 to about 60 percent of a combination of at least one monoethylenically unsaturated hardening monomer and at least one monoethylenically unsaturated softening monomer, and from about 1 to about 10 weight percent of a cross-linking agent, said hardening monomer comprising from about 25 to about 60 weight percent of the total monomers and being selected from the group consisting of styrene, acrylonitrile, and alkyl methacrylates, said softening monomer comprising up to about 75 weight percent of the total monomer composition and being selected from the group consisting of alkyl acrylates containing from 1 to 10 carbon atoms in the alkyl group.

The above described process provides a coated substrate which has on said substrate (a) a dried base coating containing a plurality of discrete particulate aggregates fixed therein, said base coating containing from about 25 to about 50 weight percent of a polymer obtained from at least one monoethylenically unsaturated monomer selected from the group consisting of styrene, butadiene, isoprene, vinyl chloride, acrylonitrile, vinyl acetate, vinylidene chloride, and alkyl acrylate and methacrylate esters containing from 1 to 10 carbon atoms in the alkyl group, from about 0.4 to about 4% by weight of a surface active agent, up to about 20 percent by weight of a plasticizer, and up to about 50% by weight of a pigment, and (b) a dried top coating comprising from about 50 to about 95 weight percent of a copolymer formed from a combination of at least one monoethylenically unsaturated hardening monomer and at least one monoethylenically unsaturated softening monomer, and from 1 to about 10 weight percent of at least one cross-linking agent selected from the group consisting of N-methylol acrylamide, acrylamide, N-methylol methacrylamide, and methacrylamide, said hardening monomer comprising from about 25 to about 60 weight percent of the total monomers and being selected from the group consisting of styrene, acrylonitrile, and alkyl methacrylates, said softening monomer comprising up to about 75 weight percent of the total monomer composition and being selected from the group consisting of alkyl acrylates containing from 1 to 10 carbon atoms in the alkyl group.

For a more complete understanding of the present invention, reference is now made to the following specific examples which are illustrative of the present invention.

DESCRIPTION OF THE PREFERRED EMBODIMENTS

EXAMPLE 1

Compositions (I) Basecoating: A plasticized aqueous copolymer dispersion was prepared by a conventional emulsion polymerization procedure by emulsifying the following monomers in the indicated weight percentages (based on total monomer content) employing as emulsifying agents (surfactants) 0.9 weight percent of a combination of nonylphenoxypoly(ethyleneoxy) ethanol and the sodium salt of condensed naphthalene sulfonic acid:

| | Percent |
|---|---|
| Styrene | 79.0 |
| Acrylonitrile | 17.0 |
| Methacrylic acid | 4.0 |

The final polymer solids concentration of the copolymer dispersion on an overall basis was 36%. To this emulsion was added (on an overall basis) with efficient stirring 18.5% of a plasticizer system consisting of tributyl phosphate, dibutyl phthalate, and ethylene glycol.

This copolymer dispersion was pigmented by admixture with an aqueous dispersion of titanium dioxide and clay such that the resultant base coating product contained approximately 13% of polymers, 7% of plasticizers and 28% of pigments.

(II) Aggregate: The aggregate consisted of pigmented polyvinyl acetate in flake or chip form.

(III) Top coating: An aqueous, cross-linkable copolymer dispersion was prepared by a conventional emulsion polymerization procedure by emulsifying and polymerizing the following monomers in the indicated weight percentages (based on total monomer content):

| | Percent |
|---|---|
| Methyl methacrylate | 42 |
| Butyl acrylate | 37 |
| Acrylonitrile | 15 |
| N-methylol acrylamide (60%) | 6 |

The final polymer solids concentration of the copolymer dispersion was 46%. To 95 parts of this dispersion were added 5 parts of a plasticizer-catalyst composition comprising the following components in the indicated proportions:

Plasticizer-Catalyst

| Ingredient: | Percent by weight |
|---|---|
| Monoethyl ether of diethylene glycol | 50 |
| Dibutyl phthalate | 33 |
| Aluminum chloride solution (32° Bé.) | 12 |
| Antifoam agent | 5 |

Process

The base coat is applied to the floor to be covered by pouring a quantity thereon sufficient to cover an area about 3 feet wide and 8 feet long. The liquid is spread or rolled by any convenient means to form a uniform coating. The aggregate in chip form is then sprinkled onto the wet base coat until the base coat is substantially evenly covered. The process is repeated until the floor is thoroughly covered. The coating is then allowed to air dry, which will require about 2 hours under ordinary weather conditions or slightly more time under humid conditions. After drying, loose chips are removed by sweeping or vacuuming, or other convenient means. The top coating is then applied to the dried, aggregate-containing base coat in the same manner as was the base coat. The top coat will dry in about the same time as the base coat, but requires about 12 hours for substantially complete cure, after which time it is ready for ordinary foot traffic. Another day of curing time should be allowed before placing heavy objects on the floor. A floor covering so prepared was attractive and exhibited excellent durability, and resistance to detergents, black-heel marks and sunlight.

EXAMPLE 2

The process of Example 1 was repeated with the exception that the monomer composition of the top coating contained the following monomers in the indicated proportions:

| | Percent |
|---|---|
| Methyl methacrylate | 39 |
| Butyl acrylate | 36 |
| Acrylonitrile | 15 |
| Methacrylic acid | 4 |
| N-methylol acrylamide (60%) | 6 |

The final polymer solids concentration of the copolymer dispersion was 46%. The covering displayed the same excellent qualities as that of Example 1.

EXAMPLE 3

The process of Example 1 was repeated with the exception that the monomer composition of the top coating contained the following monomers in the indicated weight percentages (based on total monomer content):

| | Percent |
|---|---|
| Ethyl acrylate | 54 |
| Butyl acrylate | 14 |
| Acrylonitrile | 28 |
| N-methylol acrylamide (100%) | 4 |

The final polymer solids concentration of the copolymer dispersion was 45%. The floor covering displayed the same excellent qualities as that of Example 1.

What is claimed is:

1. A process for applying a durable covering to a substrate comprising:
   (I) applying to said substrate a base coating comprising an aqueous copolymer dispersion containing as essential components water, a water insoluble polymer obtained by the emulsion polymerization of a monoethylenically unsaturated monomer or monomers, and a surfactant,
   (II) adding to said base coating a plurality of discrete particulate aggregates,
   (III) drying said aggregate-containing base coating to fix the aggregates therein,
   (IV) applying to said dried aggregate-containing coating a clear top coating comprising an aqueous cross-linkable copolymer dispersion prepared from, on an overall basis, about 30 to about 60 weight percent of a combination of at least one monoethylenically unsaturated hardening monomer and at least one monoethylenically unsaturated softening monomer, and from about 1 to about 10 weight percent of a cross-linking agent, said hardening monomer comprising from about 25 to about 60 weight percent of the total monomers and being selected from the group consisting of styrene, acrylonitrile, and alkyl methacrylates, and said softening monomer comprising up to about 75 weight percent of the total monomer composition and being selected from the group consisting of alkyl acrylates containing from 1 to 10 carbon atoms in the alkyl group, and drying said top coating.

2. The process of claim 1 wherein the base coating contains from about 5 to about 25 weight percent on an overall basis of at least one water insoluble polymer obtained by the emulsion polymerization of a monoethylenically unsaturated monomer selected from the group consisting of styrene, butadiene, isoprene, vinyl chloride, vinylidene chloride, vinyl acetate, acrylonitrile, methacrylic acid, and alkyl acrylate and methacrylate esters containing up to 10 carbon atoms in the alkyl group, from about 0.2 to about 2 weight percent of a surface active agent, up to about 55 weight percent of a pigment, and up to about 10 weight percent of a plasticizer.

3. The process of claim 1 wherein the aggregate is selected from the group consisting of pigmented synthetic resins, glass, sand, paper, metal and minerals.

4. The process of claim 1 wherein the cross-linking agent is selected from the group consisting of N-methylol acrylamide, acrylamide, N-methylol methacrylamide, and methacrylamide.

5. The process of claim 1 wherein the hardening monomer comprises a combination of acrylonitrile and methyl methacrylate and the softening monomer comprises ethyl acrylate or butyl acrylate.

6. A coated substrate which comprises,
(a) a substrate,
(b) on said substrate, a dried base coating containing a plurality of discrete particulate aggregates fixed therein, said base coating containing from about 25 to about 50 weight percent of a polymer obtained from about at least one monoethylenically unsaturated monomer selected from the group consisting of styrene, butadiene, isoprene, vinyl chloride, acrylonitrile, vinyl acetate, vinylidene chloride, and alkyl acrylate and methacrylate esters containing from 1 to 10 carbon atoms in the alkyl group, from about 0.4 to about 4% by weight of a surface active agent, up to about 20 percent by weight of a plasticizer, and up to about 75% by weight of a pigment, and
(c) a dried top coating comprising from about 50 to about 95 weight percent of a cross-linked copolymer formed from a combination of at least one monoethylenically unsaturated hardening monomer and at least one monoethylenically unsaturated softening monomer, and from about 1 to about 10 weight percent of at least one cross-linking agent selected from the group consisting of N-methylol acrylamide, acrylamide, N-methylol methacrylamide, and methacrylamide, said hardening monomer comprising from about 25 to about 60 weight percent of the total monomers and being selected from the group consisting of styrene, acrylonitrile, and alkyl methacrylates, said softening monomer comprising up to about 75 weight percent of the total monomer composition and being selected from the group consisting of alkyl acrylates containing from 1 to 10 carbon atoms in the alkyl group.

7. A coated floor having as a top coating thereon a composition comprising from about 50 to about 95 weight percent of a cross-linked copolymer formed from a combination of at least one monoethylenically unsaturated hardening monomer and at least one monoethylenically unsaturated softening monomer, and from about 1 to about 10 weight percent of at least one cross-linking agent selected from the group consisting of N-methylol acrylamide, acrylamide, N-methylol methacrylamide, and methacrylamide, said hardening monomer comprising from about 25 to about 60 weight percent of the total monomers and being selected from the group consisting of styrene, acrylonitrile, and alkyl methacrylates, said softening monomer comprising up to about 75 weight percent of the total monomer composition and being selected from the group consisting of alkyl acrylates containing from 1 to 10 carbon atoms in the alkyl group.

8. The coated floor of claim 7 wherein the hardening monomer comprises a combination of acrylonitrile and methyl methacrylate and the softening monomer comprises butyl acrylate.

References Cited
UNITED STATES PATENTS

| | | | |
|---|---|---|---|
| 2,994,676 | 8/1961 | Kocsan et al. | 260—29.6 TA |
| 3,011,988 | 12/1961 | Luedke et al. | 260—29.6 TA |
| 3,112,223 | 11/1963 | Logemann et al. | 260—29.6 TA |
| 3,130,176 | 4/1964 | Zdanowski | 117—72 |
| 3,549,404 | 12/1970 | Liberti et al. | 117—26 |
| 3,476,587 | 11/1969 | Demol et al. | 117—72 |
| 3,552,988 | 1/1971 | Boiardi | 117—16 |
| 2,757,106 | 7/1956 | Brown et al. | 117—161 U |
| 3,522,200 | 7/1970 | Hardt et al. | 117—161 UH |
| 3,549,566 | 12/1970 | Mesirov | 117—161 UC |

WILLIAM D. MARTIN, Primary Examiner

R. M. SPEER, Assistant Examiner

U.S. Cl. X.R.

117—2, 16, 28, 29, 33, 72, 161 UC, 161 UF, 161 UH, 161 UZ; 260—29.6 RW, 29.6 TA